United States Patent
Kwon

(10) Patent No.: US 9,033,568 B2
(45) Date of Patent: May 19, 2015

(54) BACKLIGHT MODULE FOR A LIQUID CRYSTAL DISPLAY

(75) Inventor: Young Man Kwon, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 860 days.

(21) Appl. No.: 12/561,354

(22) Filed: Sep. 17, 2009

(65) Prior Publication Data
US 2010/0073916 A1  Mar. 25, 2010

(30) Foreign Application Priority Data
Sep. 19, 2008  (CN) .......................... 2008 1 0222552

(51) Int. Cl.
F21V 7/04       (2006.01)
G02F 1/1335     (2006.01)
H01R 13/24      (2006.01)
H01R 33/08      (2006.01)

(52) U.S. Cl.
CPC .... G02F 1/133604 (2013.01); *G02F 1/133608* (2013.01); *H01R 13/2407* (2013.01); *H01R 33/0827* (2013.01)

(58) Field of Classification Search
CPC .................... G02F 1/133604; G02F 1/133608; H01R 13/2407; H01R 33/0827
USPC ...................................... 362/634, 97.1, 97.3
See application file for complete search history.

(56) References Cited

U.S. PATENT DOCUMENTS

| | | | | |
|---|---|---|---|---|
| 4,597,035 | A | * | 6/1986 | Lettenmeyer .................. 362/219 |
| 4,978,319 | A | * | 12/1990 | Freed ............................. 439/638 |
| 5,109,323 | A | * | 4/1992 | Waycaster ................ 362/217.07 |
| 7,585,100 | B2 | * | 9/2009 | Aoki et al. ..................... 362/634 |
| 2007/0183149 | A1 | * | 8/2007 | Ko et al. ......................... 362/225 |
| 2009/0098744 | A1 | * | 4/2009 | Ohmori et al. .................. 439/33 |
| 2010/0053985 | A1 | * | 3/2010 | Yang ............................. 362/490 |

FOREIGN PATENT DOCUMENTS

| | | |
|---|---|---|
| JP | 7-41849 U | 7/1995 |
| JP | 08-043817 A | 2/1996 |
| JP | 3128856 U | 12/2006 |
| JP | 2008-107515 A | 5/2008 |
| KR | 1998-082343 A | 12/1998 |

* cited by examiner

*Primary Examiner* — Anh Mai
*Assistant Examiner* — Jessica M Apenteng
(74) *Attorney, Agent, or Firm* — Ladas & Parry LLP

(57) ABSTRACT

The present invention discloses a fluorescent lamp assembly for a liquid crystal display. The assembly comprises a bracket having a fluorescent lamp fixing channel and a wire fixing channel; a fluorescent lamp positioned inside the fluorescent lamp fixing channel; a conductive elastic member positioned inside the bracket with one end thereof connected to the fluorescent lamp through the fluorescent lamp fixing channel; and wire positioned in the wire fixing channel. One end of the wire is connected to the other end of the conductive elastic member.

16 Claims, 2 Drawing Sheets

BACKLIGHT MODULE FOR A LIQUID CRYSTAL DISPLAY

BACKGROUND

Embodiments of the present invention relate to a backlight module for a liquid crystal display.

A liquid crystal display (LCD) is not a self emitting display device, for which a backlight module is required to provide a light source. According to the position of a light source in a backlight module, a backlight module can be an edge light type backlight module or a direct light backlight module. The most commonly used light source in a backlight module can be a linear light source such as a fluorescent lamp (for example a cold cathode fluorescent lamp (CCFL)) and a spot light source such as a light emitting diode (LED).

An edge light type backlight module used for a liquid crystal display may have a fluorescent lamp assembly to hold a fluorescent lamp on a side within the backlight module. In mounting fluorescent lamps on such a conventional fluorescent lamp assembly used for a liquid crystal display or wiring after the mounting, the operator needs to pull the wires. The fluorescent lamp may be broken when the wires are pulled, and such broken fluorescent lamp account for about 10% of the unqualified products, being the third most important factor.

FIG. 1 is a cross sectional view of the conventional fluorescent lamp assembly 100 for a LCD. The conventional fluorescent lamp comprises a lamp tube 1 having electrodes. The protruding portion on the outer side of the lamp tube 1 is a lead 11 for one of the electrodes. The fluorescent lamp assembly for a LCD further comprises a bracket 2 which has a fluorescent lamp fixing channel 13 and a wire fixing channel 14. The lamp tube 1 of the fluorescent lamp is inserted into and fixed to the fluorescent lamp fixing channel 13, and a wire 4 enters the bracket 2 and extends through the wire fixing channel 14 to be connected with the lead 11 of the fluorescent lamp. The wire 4 is welded to the lead 11 by soldering within the bracket 2 with forming a soldered dot, and the wire 4 and the lead 11 run perpendicularly to each other. In the above mentioned fluorescent lamp assembly 100 for a LCD, in order to prevent the lamp from being broken by the pull exerted on the wire, the wire 4 and the lead 11 are welded to be perpendicular to each other, so that the direct application of the pulling force exerted on the fluorescent lamp can be avoided. However, even so, when the pulling force of the wire is too powerful, the fluorescent lamp can still be broken.

SUMMARY

A backlight module for a LCD is provided in one aspect of the present invention. The backlight module comprises: a bracket comprising a fluorescent lamp fixing channel and a wire fixing channel; a fluorescent lamp positioned inside the fluorescent lamp fixing channel; a conductive elastic member positioned inside the bracket with one end thereof connected to the fluorescent lamp through the fluorescent lamp fixing channel; and a wire positioned in the wire fixing channel, one end of the wire being connected to the other end of the conductive elastic member.

In the above mentioned embodiment, the conductive elastic member is provided inside the bracket, and therefore, when a downward pulling force is exerted on the wire when the wire is pulled during assembling of the fluorescent lamp or wiring, the pulling force is first applied on the conductive elastic member connected to the wire, and then the conductive elastic member is deformed due to stretch, providing a function of buffering, and thus prevent the lamp tube of the fluorescent lamp from being broken.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Figure 1:
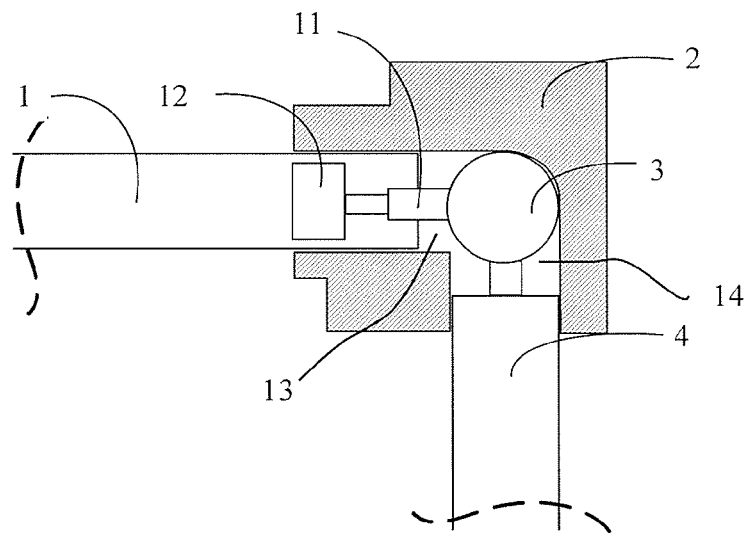
FIG. 1 is a cross sectional view of a fluorescent lamp assembly for a LCD of the prior art.
Figure 2:
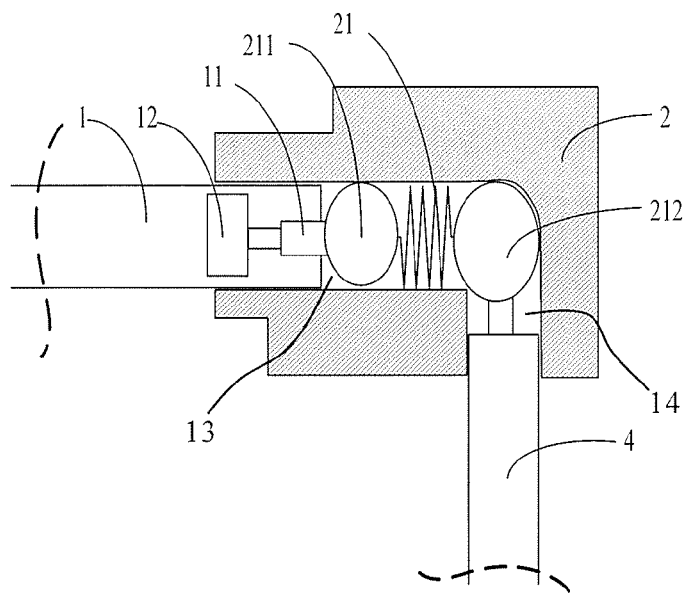
FIG. 2 is a cross sectional view of a fluorescent lamp assembly for a LCD according to a first embodiment of the present invention.

FIG. 2 is a cross sectional view of the fluorescent lamp assembly 200 for a LCD according to a first embodiment of the present invention. The assembly 200 comprises a bracket 2, a conductive elastic member 21, and a wire 4. The bracket 2 has a fluorescent lamp fixing channel 13 and a wire fixing channel 14. The fluorescent lamp is inserted into the fluorescent lamp fixing channel 13 and fixed thereto, and the wire 4 is positioned inside the wire fixing channel 14 and is connected with the fluorescent lamp via the conductive elastic member 21. The conductive elastic member 21 of the present embodiment may be a spring 21 possessing electrical conductivity and positioned inside the bracket 2.

When the wire is pulled during assembling of the fluorescent lamp or wiring, there is a pulling force exerted downwardly on the wire 4, which is first applied on the conductive elastic member 21 connected to the wire 4. Then, the conductive elastic member 21 is deformed due to stretch, providing a function of buffering, and thus prevents the lamp tube of the fluorescent lamp from being broken.

In particular, the fluorescent lamp comprises a lamp tube 1, an electrode 12 provided inside the lamp tube, and a lead protruding from a side of the lamp tube and connected to one end of the spring 21 through a first connecting portion 211. One end of the wire 4 is connected to the other end of the spring 21 through a second connecting portion 212. The first connecting portion 211 and the second connecting portion 212 are soldered dots formed in soldering.

Further, the fluorescent lamp fixing channel 13 and the wire fixing channel 14 are perpendicular to each other, making the assembling direction of the fluorescent lamp perpendicular to that of the wire 4, so that the pulling force exerted on the wire 4 can be prevented from being applied on the fluorescent lamp directly.

Further, the width of the spring 21 is larger than the width of the wire fixing channel 14, so that when the wire 4 is pulled, the spring 21 will not loss its function of buffering as a consequence of being dragged out of the fluorescent lamp fixing channel 13 and into the wire fixing channel 14.

Figure 3:
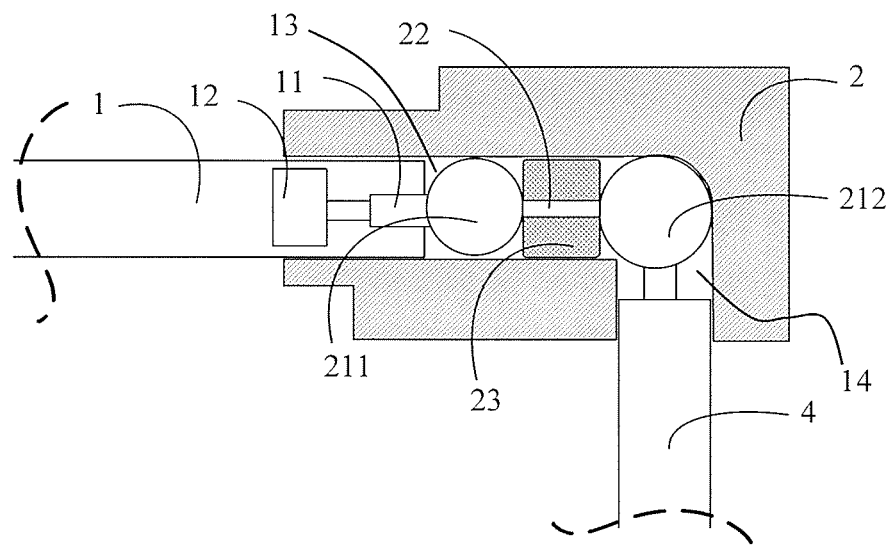
FIG. 3 is a cross sectional view of a fluorescent lamp assembly for a LCD according to a second embodiment of the present invention.

FIG. 3 is a cross sectional view of the fluorescent lamp assembly 300 for a LCD according to a second embodiment of the present invention. The assembly 300 comprises a bracket 2, a conductive elastic member 21, and a wire 4. The bracket 2 has a fluorescent lamp fixing channel 13 and a wire fixing channel 14. The fluorescent lamp is inserted into the fluorescent lamp fixing channel 13 and fixed thereto, and the wire 4 is positioned inside the wire fixing channel 14 and connected to the fluorescent lamp through the conductive elastic member 21. The conductive elastic member 21 of the present embodiment comprises an elastic wire 22 and an elastic block 22 sheathed over the elastic wire 22 and is positioned inside the bracket 2.

When the wire 4 is pulled during assembling of the fluorescent lamp or wiring, there is a pulling force exerted downwardly on the wire, which is first applied on the elastic wire 22 connected to the wire 4. Then, the elastic wire 22 is deformed due to stretch, providing a function of buffering, and thus prevents the lamp tube of the fluorescent lamp from being broken. In addition, when the fluorescent lamp is pulled to move, the elastic block 23 can also serve to buffer, providing further guarantee of the up-to-standard rate of fluorescent lamps.

Specifically, the fluorescent lamp comprises a lamp tube 1, an electrode 12 provided inside the lamp tube, and a lead 11 protruding from a side of the lamp tube and connected to one end of the elastic wire 22 through a first connecting portion 211. One end of the wire 4 is connected to the other end of the elastic wire 22 through a second connecting portion 212. The first connecting portion 211 and the second connecting portion 212 are soldered dots formed in soldering.

Further, in this embodiment, the fluorescent lamp fixing channel 13 and the wire fixing channel 14 are fixed to be perpendicular to each other, making the assembling direction of the fluorescent lamp perpendicular to that of the wire 4, so that the pulling force of the wire can be prevented from being applied on the fluorescent lamp directly.

Further, the width of the elastic block 23 is larger than the width of the wire fixing channel, so that when the wire is pulled, the elastic wire 22 and the elastic block 23 will not loss the function of buffering as a consequence of being dragged out of the fluorescent lamp fixing channel 13 and into the wire fixing channel 14.

Additionally, the above mentioned effect of preventing the lamp from being broken can also be achieved by forming the wire 4 or the lead 11 with elastic and conductive material to allow itself to have the ability of buffering, or by forming part of the wire 4 or the lead 11 that is inside the bracket into an elastic and curved structure like a spring.

The embodiment of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A backlight module for a liquid crystal display, comprising:
    a bracket comprising a fluorescent lamp fixing channel and a wire fixing channel;
    a fluorescent lamp positioned inside the fluorescent lamp fixing channel;
    a conductive elastic member positioned inside the bracket with one end thereof connected to the fluorescent lamp through the fluorescent lamp fixing channel; and
    a wire positioned in the wire fixing channel, one end of the wire being connected to the other end of the conductive elastic member;
    wherein the conductive elastic member is positioned between the fluorescent lamp and the wire to electrically connect the fluorescent lamp and the wire so as to let electric current flow from the wire through the fluorescent lamp; and
    wherein the conductive elastic member is positioned between the fluorescent lamp and the wire and the other end of the conductive elastic member connected to the wire is adapted to move upon an act of pulling so as to lengthen the distance between the fluorescent lamp and the wire when deforming due to stretch.

2. The backlight module of claim 1, wherein the fluorescent lamp comprises a lamp tube, an electrode provided inside the lamp tube and a lead protruding from a side of the lamp tube, the lead being connected to the electrode and the one end of the conductive elastic member.

3. The backlight module of claim 2, wherein the one end of the conductive elastic member is connected to the lead through a first connecting portion, and the other end thereof is connected to the one end of the wire through a second connecting portion.

4. The backlight module of claim 1, wherein the conductive elastic member is a spring or an elastic wire.

5. The backlight module of claim 4, further comprising an elastic block sheathed over the elastic wire.

6. The backlight module of claim 5, wherein a width of the elastic block is larger than a width of the wire fixing channel.

7. The backlight module of claim 4, wherein a width of the spring is larger than a width of the wire fixing channel.

8. The backlight module of claim 1, wherein the conductive elastic member is positioned between the fluorescent lamp and the wire to buffer the pulling between the fluorescent lamp and the wire.

9. The backlight module of claim 8, wherein the conductive elastic member is a spring or an elastic wire.

10. The backlight module of claim 1, wherein the conductive elastic member is a spring or an elastic wire.

11. A backlight module for a liquid crystal display, comprising:
    a bracket comprising a fluorescent lamp fixing channel and a wire fixing channel;
    a fluorescent lamp positioned inside the fluorescent lamp fixing channel;
    a conductive elastic member positioned inside the bracket with one end thereof connected to one end of the fluorescent lamp through the fluorescent lamp fixing channel; and
    a wire positioned in the wire fixing channel, one end of the wire being connected to the other end of the conductive elastic member;
    wherein the conductive elastic member is positioned between the fluorescent lamp and the wire to electrically connect the fluorescent lamp and the wire so as to let electric current flow from the wire through the fluorescent lamp, and the conductive elastic member is a coil spring and an axis of the coil spring is positioned along a direction form the one end of the fluorescent lamp to the one end of the wire and the other end of the conductive elastic member connected to the wire is adapted to move along the direction upon an act of pulling for elastic deformation along the direction.

12. The backlight module of claim 11, wherein the fluorescent lamp comprises a lamp tube, an electrode provided inside the lamp tube and a lead protruding from a side of the lamp tube at the one end of the fluorescent lamp, the lead being connected to the electrode and the one end of the conductive elastic member.

13. The backlight module of claim 12, wherein the one end of the conductive elastic member is connected to the lead through a first connecting portion, and the other end thereof is connected to the one end of the wire through a second connecting portion.

14. A backlight module for a liquid crystal display, comprising:
- a bracket comprising a fluorescent lamp fixing channel and a wire fixing channel;
- a fluorescent lamp positioned inside the fluorescent lamp fixing channel;
- a conductive elastic member positioned inside the bracket with one end thereof connected to one end of the fluorescent lamp through the fluorescent lamp fixing channel; and
- a wire positioned in the wire fixing channel, one end of the wire being connected to the other end of the conductive elastic member;
- wherein the conductive elastic member is positioned between the fluorescent lamp and the wire to electrically connect the fluorescent lamp and the wire so as to let electric current flow from the wire through the fluorescent lamp, and the conductive elastic member is an elastic wire which extends along a direction form the one end of the fluorescent lamp to the one end of the wire and the other end of the conductive elastic member connected to the wire is adapted to move along the direction upon an act of puffing for elastic deformation along the direction.

15. The backlight module of claim 14, wherein the fluorescent lamp comprises a lamp tube, an electrode provided inside the lamp tube and a lead protruding from a side of the lamp tube at the one end of the fluorescent lamp, the lead being connected to the electrode and the one end of the conductive elastic member.

16. The backlight module of claim 15, wherein the one end of the conductive elastic member is connected to the lead through a first connecting portion, and the other end thereof is connected to the one end of the wire through a second connecting portion.

* * * * *